United States Patent
Lee et al.

(10) Patent No.: US 7,200,127 B1
(45) Date of Patent: Apr. 3, 2007

(54) APPARATUS AND METHOD FOR CONTROLLING A POWER OF REVERSE LINK IN CDMA SYSTEM

(75) Inventors: Dong Do Lee, Kyunggi-do (KR); Sang Yun Lee, Kyunggi-do (KR); Byung Moo Kim, Kyunggi-do (KR)

(73) Assignee: SK Telecom Co., Ltd., Seoul (KR)

( * ) Notice: Subject to any disclaimer, the term of this patent is extended or adjusted under 35 U.S.C. 154(b) by 670 days.

(21) Appl. No.: 09/857,206

(22) PCT Filed: Oct. 21, 2000

(86) PCT No.: PCT/KR00/01192

§ 371 (c)(1),
(2), (4) Date: Jun. 22, 2001

(87) PCT Pub. No.: WO01/31824

PCT Pub. Date: May 3, 2001

(30) Foreign Application Priority Data

Oct. 26, 1999 (KR) ................................. 99-46523

(51) Int. Cl.
*H04B 7/216* (2006.01)

(52) U.S. Cl. ...................... 370/335; 370/320; 370/342; 455/522

(58) Field of Classification Search ................. 370/335, 370/342, 441; 455/441, 522
See application file for complete search history.

(56) References Cited

U.S. PATENT DOCUMENTS

| | | | | |
|---|---|---|---|---|
| 5,924,043 | A * | 7/1999 | Takano ........................ | 455/522 |
| 6,334,047 | B1 * | 12/2001 | Andersson et al. ........... | 455/69 |
| 6,343,218 | B1 * | 1/2002 | Kaneda et al. .............. | 455/522 |
| 6,389,296 | B1 * | 5/2002 | Shiraki et al. .............. | 455/522 |
| 6,490,460 | B1 * | 12/2002 | Soliman ..................... | 455/522 |
| 6,711,384 | B2 * | 3/2004 | Kubo et al. .................. | 455/68 |
| 2003/0003914 | A1 * | 1/2003 | Kubo et al. ................. | 455/441 |

* cited by examiner

*Primary Examiner*—Seema S. Rao
*Assistant Examiner*—Michael J. Moore
(74) *Attorney, Agent, or Firm*—Lowe Hauptman & Berner, LLP

(57) ABSTRACT

The present invention relates to a method of controlling transmitting power level of a mobile station in CDMA communication system. This invention estimates a moving speed of a mobile station and changes a power control step size according to the estimated moving speed, thereby tracking power level control command, which is transmitted from a base station to compensate for the power variation of its received signals, quickly and precisely.

5 Claims, 3 Drawing Sheets

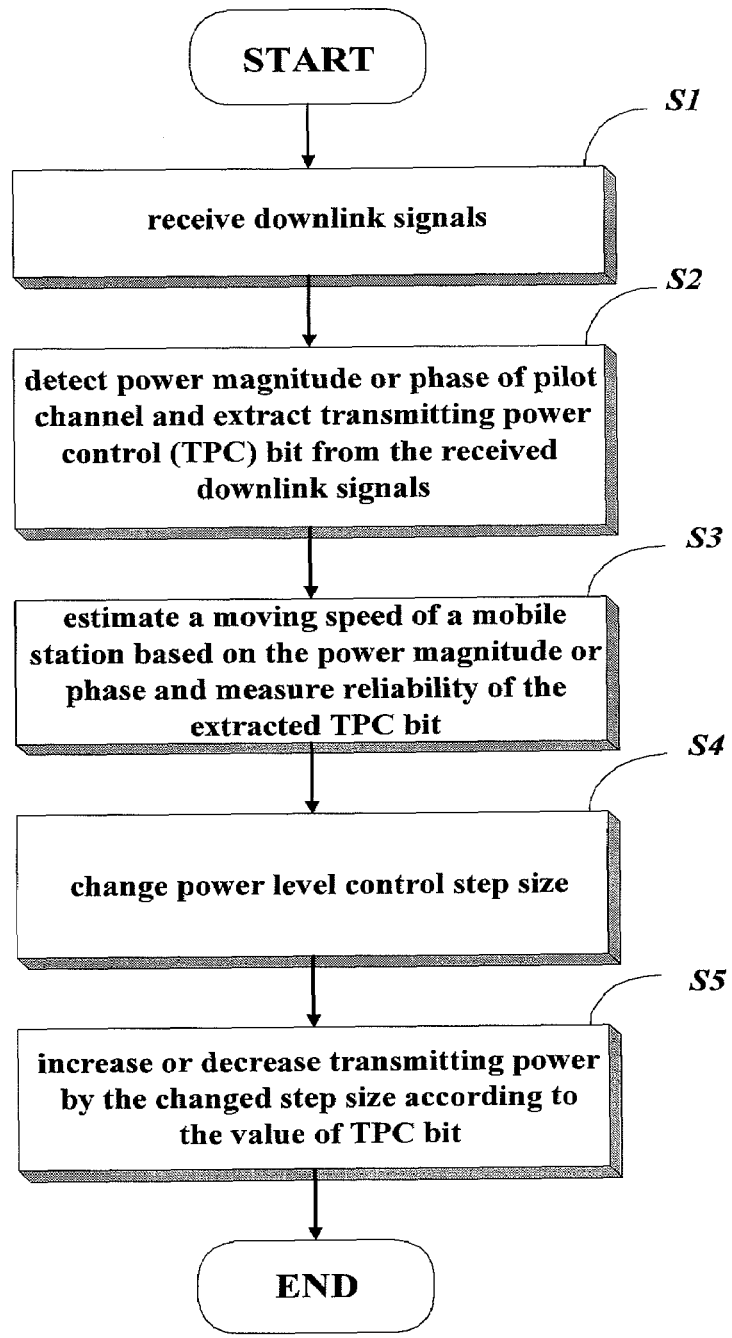

APPARATUS AND METHOD FOR CONTROLLING A POWER OF REVERSE LINK IN CDMA SYSTEM

1. TECHNICAL FIELD

The present invention relates to a method of controlling uplink (reverse link) power level in a code division multiple access (CDMA) communication system.

2. BACKGROUND ART

In a conventional method conducting a closed-loop power control for a reverse link, a signal power from a mobile station (MS) is estimated at a base station (BTS), the estimated power is then compared with critical power magnitude required for maintaining signal quality. According to the comparison result, the BTS transmits a TPC (Transmit Power Control) bit for commanding the MS to increase or decrease current transmitting power level of a MS. Receiving the TPC bit, the MS interprets it and increments or decrements the transmitting power level stepwise. The power level adjusting resolution is 1.0 dB.

FIG. 1 illustrates a functional block diagram of a power controlling unit installed in a mobile station.

A MS receives downlink (forward link) signals from a neighboring BTS, then, an automatic gain controller (AGC) 11 adjusts its gain to flatten the received signal level, a demodulator 12 extracts the TPC bit from the received downlink signals, a TPC interpreter 13 interprets which operation the extracted TPC bit is requesting. A power level controller 15 determines whether to increment or decrement closed-loop power level by the adjusting step $P_{closed}$ based on the interpretation, and adds the determined $\pm P_{closed}$ to an open-loop power control level $\Delta P_{open}$, which is determined by a RSSI 14 based on the level of the output signal of the AGC 11. A power adjusting signal for the total power control level $\Delta P_t$ ($=\Delta P_{open} \pm P_{closed}$) is applied to a high-power amplifier (HPA) 16 from the power level controller 15 so that the current power level of uplink signals is adjusted by $\Delta P_t$.

The power level of signals transmitted from a MS is estimated every 1.25 msec at a BTS. The time 1.25 msec is equal to duration of 6 Walsh symbols and is called a power control group (PCG). Therefore, sixteen power control groups are contained in a 20 msec-long traffic frame.

A BTS transmits 1-bit TPC command to a MS based on the estimated power level every PCG. Thus, the power level controller 15 of a MS outputs the 1 dB power increment signal to the HPA 16 if the value interpreted every 1.25 msec is '1', and it outputs 1 dB power decrement signal if '0'.

However, the 1-bit TPC information is frequently distorted due to wireless environment, and if a receiving power level changes very rapidly or slowly (a power level changing speed is mainly affected by the moving speed of a MS), it is difficult to track the variation of the power level through the only 1 dB increment or decrement.

For example, supposed that power level received at a BTS is the graph of $P_{Rx}$ as shown in FIG. 2, it is ideal that the transmitting signal power level controlled by the power level controller 15 is the graph of $P_{Tx}$. However, 1 dB step ($\Delta P$) adjustment conducted every 1.25 msec can not track the graph $P_{Tx}$ exactly as shown in FIG. 2 when the variation of power level to compensate is too sharp since the moving speed of a MS is very high. In addition, when the variation of power level is too small, 1 dB-step adjustment may cause an oscillation of transmitting power level.

3. DISCLOSURE OF INVENTION

It is an object of the present invention to provide an uplink power level controlling method of adjusting power control step size based on the moving speed of a mobile station in CDMA communication system.

It is another object of the present invention to provide an uplink power level controlling method of checking the reliability of a power control command received from a BTS, and adjusting the transmitting power level based on the checked reliability.

The closed-loop uplink power controlling apparatus according to the present invention comprises: a channel estimator detecting power or phase of a specific channel of received downlink signals; a speed estimator estimating a moving speed of the mobile station based on the detected power or phase; a step adjuster changing the size of a power control step based on the estimated moving speed; a demodulator extracting a power control command contained in the received downlink signals; and a power level controller adjusting power level of transmitting signals by the changed power control step size according to the extracted power control command.

The closed-loop uplink power controlling method according to the present invention, receives downlink signals, detects power or phase of a specific channel of the received downlink signals, extracts a power control command from the received downlink signals, estimates a moving speed of a mobile station based on the detected power or phase, measures the reliability of the extracted power control command, changes a power control step size based on the estimated moving speed, and increases or decreases power level of transmitting signals by the changed power control step size according to the extracted power control command and its measured reliability.

This uplink power controlling method according to the present invention can optimize uplink transmitting power and prevent the quality of uplink signals from being degraded due to errors in transmitting power control information delivered from a BTS to a MS, thereby reducing power consumption of a MS, improving the quality of an uplink signal, and increasing the number of MSs admittable to a BTS.

4. BRIEF DESCRIPTION OF DRAWINGS

The accompanying drawings, which are included to provide a further understanding of the invention, illustrate the preferred embodiment of this invention, and together with the description, serve to explain the principles of the present invention.

In the drawings:

FIG. 4 is a flow diagram embodying an uplink closed-loop power level controlling method according to the present invention.

5. MODES FOR CARRYING OUT THE INVENTION

The accompanying drawings illustrate the preferred embodiments of the present invention, and together with the description, serve to explain the principles of the present invention.

Figure 3:
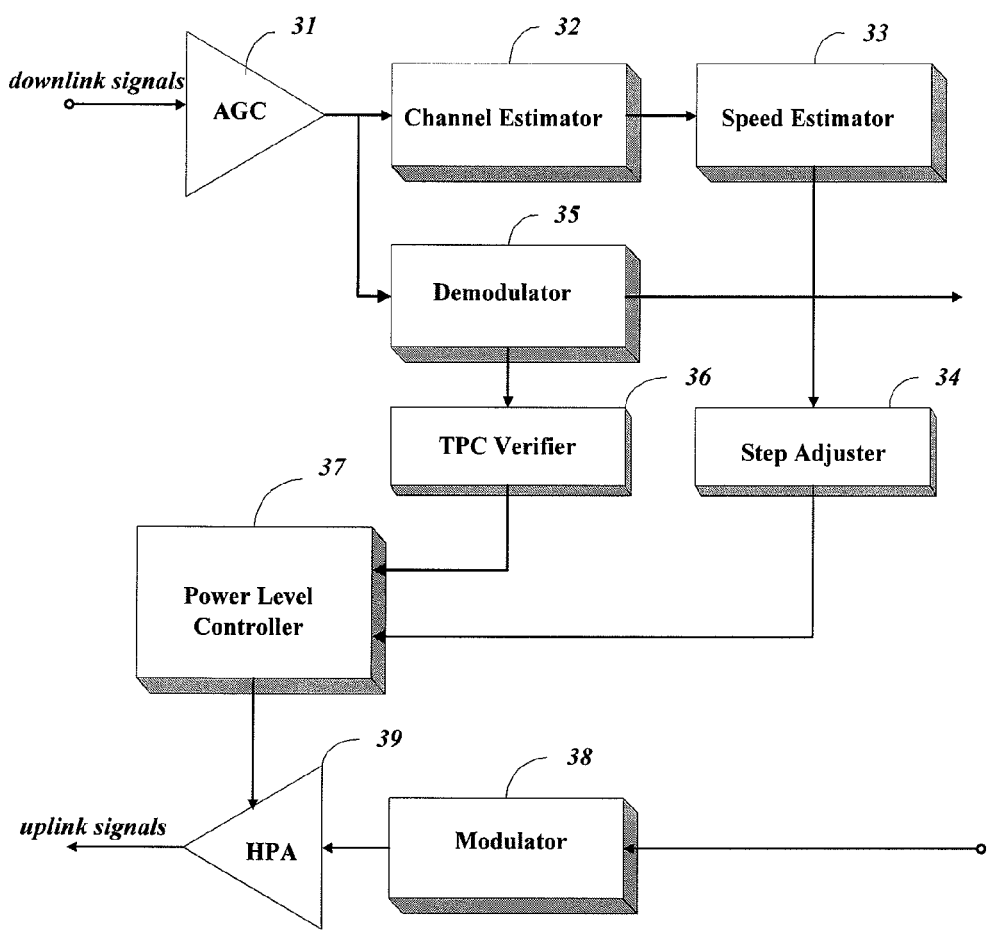
FIG. 3 illustrates a block diagram of a closed-loop power controlling unit according to the present invention.

FIG. 3 illustrates a block diagram of a closed-loop power controlling unit of a MS according to the present invention.

This power controlling unit of FIG. 3 comprises an AGC 31 flattening the level of downlink signals received from a neighboring BTS; a channel estimator 32 detecting magnitude and/or phase of pilot channel of output signals from the AGC 21; a speed estimator 33 estimating a moving speed of a MS based on the detected magnitude and phase of pilot channel; a step adjustor 34 adjusting a power controlling step size ($\Delta P$) based on the estimated moving speed; a demodulator 35 extracting TPC bits from the level-flattened downlink signals from the AGC 31; a TPC verifier 36 measuring how much reliable the extracted TPC bits are; a power level controller 37 outputting a power control signal commanding to increment or decrement current transmitting power level by the adjusted step size ($\Delta P$) according to the TPC bits whose reliability is measured by the TPC verifier 36; and a HPA 39 power-amplifying uplink signals, which has been modulated through a modulator 38, according to the power control signal.

Figure 1:
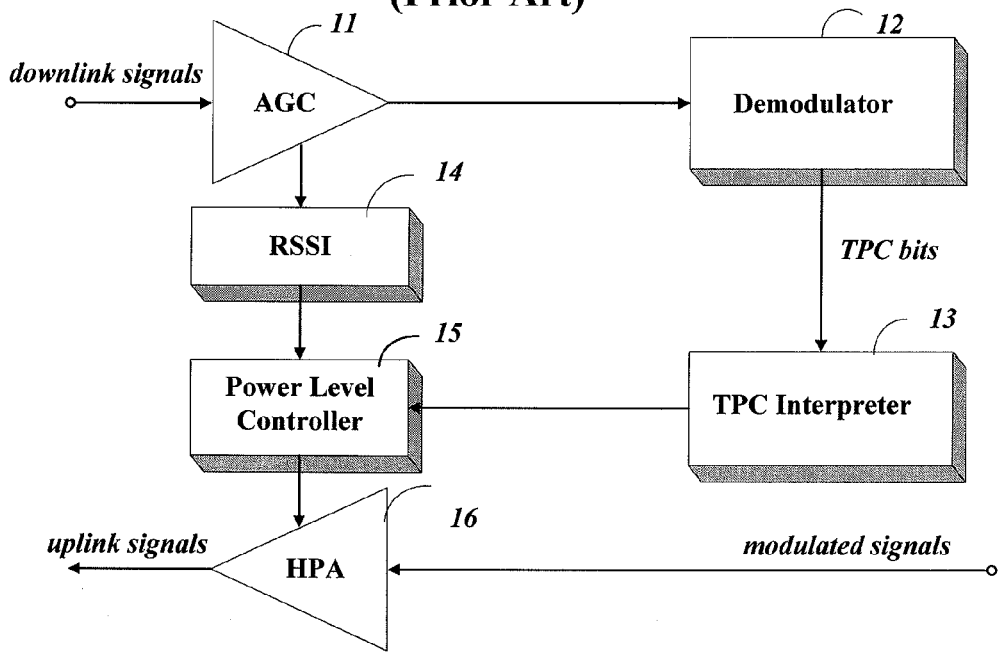
FIG. 1 illustrates a functional block diagram of a power controlling unit installed in a mobile station.
Figure 2:
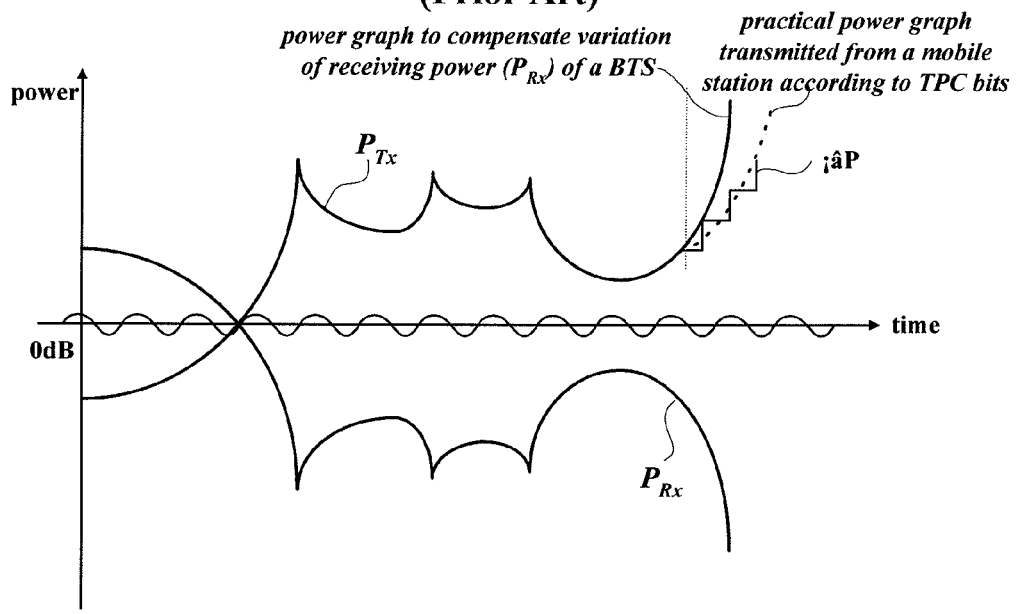
FIG. 2 is exemplary curves showing receiving power of a BTS and transmitting power of a MS controlled according to the power control command.

The estimated moving speed of a MS is closely correlated with the slope of power level graph, for example, the graph $P_{Rx}$ in FIG. 2, of uplink signals received at a BTS.

FIG. 4 is a flow diagram embodying an uplink closed-loop power level controlling method according to the present invention. This flow diagram conducted in the power controlling unit configured as FIG. 3 is explained in detail.

Downlink signals from a neighboring BTS is received at a MS, the AGC 31 flattens the average level of the received signals through adjusting its gain, and applies the level-flattened signals to the channel estimator 32 and the demodulator 35 at the same time (S1). The channel estimator 32 detects power magnitude and/or phase of the pilot channel of the downlink signals. The demodulator 35 demodulates the received downlink signals and extracts power control information, that is, TPC bit from the demodulated signals (S2).

The speed estimator 33 estimates the moving speed of a MS based on the detected power magnitude and/or phase of pilot channel. This estimating method is explained later.

The TPC verifier 36 measures the reliability of the extracted TPC bit in consideration of the history of TPC bits and the energy of the just-received TPC bit (S3). For example, the rules that the more recently a TPC bit was received, the larger a weighting factor used for the TPC bit is, and that the reliability is proportional to the energy magnitude detected within the just-received TPC bit may be used to measure the reliability. Considering such rules, a reliability measuring equation is derived as follows.

$$\text{reliability}(W) = \frac{\sum_{i}^{N} a_i TPC_i}{N} W_1 + E_{TPC} W_2$$

where weighting factor condition of $a_i > a_{i+1}$ should be satisfied since smaller i means nearer time to the present, N is the number of data sampled within a TPC bit, $E_{TPC}$ is energy magnitude detected at a just-received TPC bit, and $W_1$ and $W_2$ are ratios to reflect how much the reliability is affected by the TPC history and the energy of the latest TPC bit, respectively. It is preferable that the condition of $W_1 < W_2$ is satisfied.

The reliability measured according the above equation is used as a weighting factor for power controlling step size.

The step adjuster 34 determines and sets the power controlling step size ($\Delta P$) based on the estimated moving speed (S4). The step size is chosen within a range from 0.1 dB to 2 dB. In this determination, the step size is chosen to or over 1 dB to track the power variation quickly if the estimated moving speed is high, and it is chosen to or below 0.25 dB to track the power variation slowly, if the moving speed is low or zero. If the speed is moderate, 0.5 dB step is selected. This step size adjustment is conducted every 1.25 msec.

To simplify the step adjusting circuit, it is preferable that the adjustable step sizes are fixed to 0.25 dB, 0.5 dB, and 1 dB.

Then, the power level controller 37 controls the HPA 39 such that the transmitting power of the HPA 39 is adjusted based on the step size set by the step adjuster 34 and the measured reliability (S5). That is, the transmitting power is increased as much as the set step size multiplied by the measured reliability, if the received TPC bit is '1', and it is decreased that much, if '0'.

The equations used for the above-explained power level control process are explained.

The speed estimator 33 calculates the level crossing rate (LCR) and average fade time (AFT) from the detected power magnitude of a pilot channel based on the following equations:

$LCR = n(\gamma - A) = N/T$, where $A$ is reference level, and $N$ is # of crossings over $T$-second length; and $$AFT = i(r - A) = \frac{\sum_{i=0}^{N} t_i}{N}$$

where $t_i$ is individual fade.

After these two values of LCR and AFT are obtained, a corresponding moving speed is picked out from a pre-specified table indicative of speed versus LCR and AFT. This table is derived from experiments and theoretical feature that each of LCR and AFT is proportional to a moving speed of a MS.

The detected phase may be used to estimate the moving speed instead of the detected magnitude since the speed of phase variation is proportional to the moving speed of a MS, too.

If such moving speed estimation is done at the speed estimator 33, the step adjuster 34 determines the power control step size ($\Delta P$) corresponding to the picked moving speed. Then, the power level controller 37 calculates adjustment magnitude $P_{ADJ}$ using the equation of $P_{ADJ} = TPC \times W \times N \times \Delta P$, where TPC is sign of TPC bit($\pm 1$), W is measured reliability, N is min(C, $\Delta Pmax/\Delta P$) where C is the number of TPC bits indicative of power changes in the same direction, and $\Delta Pmax$ is maximum step size.

After the adjustment magnitude $P_{ADJ}$ is calculated, the power level controller 37 controls transmitting power of the HPA 39 to decrease or increase according to the equation of: next power level($P_n$) = current power level ($P_{n-1}$) + $P_{ADJ}$.

The invention claimed is:

1. An apparatus for controlling uplink transmitting power in a CDMA mobile station, comprising:
   a channel estimator detecting a power magnitude and/or a phase of a specific channel of received downlink signals based on the received downlink signals;
   a speed estimator estimating a moving speed of the CDMA mobile station based on the detected power magnitude and/or phase;
   a step adjuster changing the size of a power control step based on the estimated moving speed;
   a demodulator extracting a power control command contained in the received downlink signals;
   a power level controller adjusting a power level of transmitting signals by the changed power control step size according to the extracted power control command; and
   a measuring means measuring a reliability of the extracted power control command, wherein said power level controller derives a weighting factor from the measured reliability, multiplies the changed power control step size by the derived weighting factor, and increments or decrements the power level of transmitting signals by the multiplied step size.

2. The apparatus set forth in claim 1, wherein said specific channel is a pilot channel.

3. The apparatus set forth in claim 1, wherein said measuring means measures the reliability based on an energy magnitude of the extracted power control command and history of power control commands.

4. The apparatus set forth in claim 1, wherein the magnitude ($P_{ADJ}$) of power level adjusting step is determined by the equation of $P_{ADJ}=TPC \times W \times N \times \Delta P$, where TPC is a sign of a TPC bit($\pm 1$), W is measured reliability, N is min(C, $\Delta Pmax/\Delta P$) where C is a number of TPC bits indicative of power changes in a same direction, $\Delta P$ is the changed power control step size, and $\Delta Pmax$ is maximum step size.

5. A method of controlling uplink transmitting power in a CDMA communication system, comprising the steps of:
   (a) receiving downlink signals;
   (b) extracting a power control command from the received downlink signals;
   (c) calculating a reliability of the extracted power control command;
   (d) deriving a weighting factor from the calculated reliability and multiplying a determined power control step size by the derived weighting factor; and
   (e) increasing or decreasing power level of transmitting signals by the multiplied power control step size according to the extracted power control command.

* * * * *